(12) United States Patent
Killoran, Jr.

(10) Patent No.: US 10,373,232 B2
(45) Date of Patent: *Aug. 6, 2019

(54) SYSTEM AND METHOD FOR COORDINATING AND MONITORING A PLURALITY OF WEBSITES

(71) Applicant: SWOOP IP HOLDINGS LLC, Wilmington, DE (US)

(72) Inventor: John P. Killoran, Jr., Albuquerque, NM (US)

(73) Assignee: SWOOP IP HOLDINGS LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/709,673

(22) Filed: Sep. 20, 2017

(65) Prior Publication Data

US 2018/0012285 A1    Jan. 11, 2018

Related U.S. Application Data

(63) Continuation of application No. 13/456,997, filed on Apr. 26, 2012, now abandoned.

(60) Provisional application No. 61/524,898, filed on Aug. 18, 2011.

(51) Int. Cl.
  *G06Q 30/00* (2012.01)
  *G06Q 30/06* (2012.01)

(52) U.S. Cl.
  CPC ..... *G06Q 30/0631* (2013.01); *G06Q 30/0621* (2013.01)

(58) Field of Classification Search
  CPC ........... G06Q 30/0601; G06Q 30/0214; G06Q 30/0241

USPC .............................................. 705/26.1, 27.1
See application file for complete search history.

(56) References Cited

U.S. PATENT DOCUMENTS

| | | | |
|---|---|---|---|
| 5,426,781 A | 6/1995 | Kaplan et al. |
| 5,664,110 A | 9/1997 | Green et al. |
| 5,694,546 A | 12/1997 | Reisman |
| 5,706,442 A | 1/1998 | Anderson et al. |
| 5,710,887 A | 1/1998 | Chelliah et al. |

(Continued)

FOREIGN PATENT DOCUMENTS

WO    2006/119342 A2    11/2009

OTHER PUBLICATIONS

Anonymous, "Easier Access to Edgar", Fund Action; May 17, 1999; 10(2), 8.

(Continued)

*Primary Examiner* — Brandy A Zukanovich
(74) *Attorney, Agent, or Firm* — Volpe and Koenig, P.C.

(57) ABSTRACT

A system comprises at least one first processor and at least one second processor. The at least one first processor is of a vendor website and is configured to produce a web site including vendor product information and a widget on the web site. The widget on the web site, in response to a user input, has a vendor product added to a watchlist of a non-vendor third party. The widget on the web site updates the watchlist of the non-vendor third party. The at least one second processor of the non-vendor third party adds the vendor product to the watchlist in response to the widget on the web site. The at least one second processor updates the watch list in response to the widget on the web site. The at least one second processor sends the watchlist to a user.

16 Claims, 12 Drawing Sheets

(56) References Cited

U.S. PATENT DOCUMENTS

| | | | |
|---|---|---|---|
| 5,758,328 A | 5/1998 | Giovannoli |
| 5,793,972 A | 8/1998 | Shane |
| 5,794,206 A | 8/1998 | Wilkinson et al. |
| 5,799,157 A | 8/1998 | Escallon |
| 5,809,242 A | 9/1998 | Shaw et al. |
| 5,825,881 A | 10/1998 | Colvin, Sr. |
| 5,826,242 A | 10/1998 | Montulli |
| 5,826,269 A | 10/1998 | Hussey |
| 5,838,790 A | 11/1998 | McAuliffe et al. |
| 5,848,397 A | 12/1998 | Marsh et al. |
| 5,855,008 A | 12/1998 | Goldhaber et al. |
| 5,864,823 A | 1/1999 | Levitan |
| 5,870,717 A | 2/1999 | Wiecha |
| 5,890,138 A | 3/1999 | Godin et al. |
| 5,897,622 A | 4/1999 | Blinn et al. |
| 5,899,980 A | 5/1999 | Wilf et al. |
| 5,905,973 A | 5/1999 | Yonezawa et al. |
| 5,970,469 A | 10/1999 | Scroggie et al. |
| 6,101,485 A | 8/2000 | Fortenberry et al. |
| 6,246,996 B1 | 6/2001 | Stein et al. |
| 6,690,407 B1 | 2/2004 | Parker et al. |
| 6,938,048 B1 | 8/2005 | Jilk et al. |
| 6,954,737 B2 | 10/2005 | Kalantar et al. |
| 6,993,559 B2 | 1/2006 | Jilk et al. |
| 7,533,064 B1 | 5/2009 | Boesch |
| 7,577,587 B2 | 8/2009 | Gee |
| 7,912,910 B2 | 3/2011 | Banerjee et al. |
| 8,156,012 B1 | 4/2012 | Eisner et al. |
| 2002/0010746 A1 | 1/2002 | Jilk et al. |
| 2002/0065828 A1 | 5/2002 | Goodspeed |
| 2002/0103752 A1 | 8/2002 | Berger et al. |
| 2002/0120581 A1 | 8/2002 | Schiavone et al. |
| 2002/0152200 A1 | 10/2002 | Krichilsky et al. |
| 2002/0178360 A1 | 11/2002 | Wenocur et al. |
| 2003/0172005 A1* | 9/2003 | Hellal ............... G06Q 30/02 705/14.51 |
| 2003/0182263 A1 | 9/2003 | Augustine et al. |
| 2003/0217107 A1 | 11/2003 | Parry |
| 2004/0024655 A1 | 2/2004 | Estes |
| 2005/0044003 A1 | 2/2005 | O'Keefe et al. |
| 2005/0251146 A1 | 11/2005 | Quigley |
| 2007/0022007 A1 | 1/2007 | Lawe |
| 2009/0254447 A1 | 10/2009 | Blades |
| 2009/0276345 A1 | 11/2009 | Hughes |
| 2010/0010886 A1 | 1/2010 | Flynn, Jr. |
| 2010/0131523 A1* | 5/2010 | Yu ............... G06Q 10/107 707/756 |
| 2011/0202615 A1 | 8/2011 | Fletcher |
| 2011/0264555 A1* | 10/2011 | Turner-Rielle ........ G06Q 30/06 705/26.8 |
| 2011/0295749 A1 | 12/2011 | Scalisi |
| 2012/0109781 A1 | 5/2012 | Felt et al. |
| 2012/0276868 A1 | 11/2012 | Martell |

OTHER PUBLICATIONS

Truxa, Ivo; Miva® Merchant: MmPGP Secure PGP Email Merchant Notification Module; http://mivo.truxoft.com/mm0001.htm; Jan. 21, 2011; pp. 1-10.

Shiraki, T; Kokudo, J.; Ono, Y; Kashiwagi, To; "Network advertisement delivery system", retrieved from ProQuest.

* cited by examiner

| WEBSITE | WATCHLIST | | | | |
|---|---|---|---|---|---|
| | ITEM | PRICE | ADD DATE | CHANGES | |
| | Retailer Name<br>MEN'S BETA AR JACKET | $259.00 | 4/14/11 | — | BUY<br>DELETE |
| | Retailer Name<br>MEN'S PERFORMANCE SOCKS | $14.99 | 4/12/11 | — | BUY<br>DELETE |
| | Retailer Name<br>EXTREME WEATHER BACK PACK | $179.99 | 4/2/11 | — | BUY<br>DELETE |
| | ... | ... | ... | | |

500

502 EXIT WEBSITE

504 RESUME SHOPPING

FIG. 5

| WEBSITE | WATCHLIST | | | |
|---|---|---|---|---|
| | ITEM | PRICE | ADD DATE | CHANGES |
| | Retailer Name<br>MEN'S BETA AR JACKET | ~~$259.00~~<br>$219.00 | 4/14/11 | NEW PRICE! [BUY] [DELETE] |
| | Retailer Name<br>MEN'S PERFORMANCE SOCKS | $14.99 | 4/12/11 | AVAILABE IN AQUA! [BUY] [DELETE] |
| | Retailer Name<br>EXTREME WEATHER BACK PACK | $179.99 | 4/2/11 | — [BUY] [DELETE] |
| | ... | ... | ... | |

[EXIT WEBSITE]
[RESUME SHOPPING]

SYSTEM AND METHOD FOR COORDINATING AND MONITORING A PLURALITY OF WEBSITES

CROSS REFERENCE TO RELATED APPLICATIONS

This application is a continuation of U.S. patent application Ser. No. 13/456,997, filed Apr. 26, 2012, which claims the benefit of U.S. Provisional Application No. 61/524,898 filed on Aug. 18, 2011, which are incorporated by reference as if fully set forth.

BACKGROUND

The internet has brought unprecedented amounts of information to the fingertips of users across the globe. As the quality of search engine algorithms has continued to improve, it has been easier for users to receive search results that are closer to their expectations. Accordingly, access to large volumes of information has provided many benefits to internet users, such as providing a more solid foundation upon which users may base their decisions.

There has been no greater effect by the internet on preexisting businesses than that on retail stores and their business models. Shoppers were once relegated to searching physical stores within the vicinity of their homes. Shoppers now have access to retail and virtual stores around the globe, and can compare and contrast products, prices and information regarding all manner of products and services from those retailers. This has given shoppers unparalleled power to shop for the best price and the specific product for which they are looking.

However, there has been a downside to this proliferation of information. There are now so many retail websites, with so much information on each website, that the shopping experience has begun to lead to information overload and shopping fatigue. It becomes difficult for shoppers to keep track of which website(s) on which they have found a particular item, or which items on a particular website they have been interested. The shopper has become frustrated, and the shopping experience is greatly diminished as a result.

The designers of retail websites understand this frustration and have instituted measures to help shoppers in this regard. Most retail websites now allow a user to put things in a "shopping cart" for later purchase, or even permit a shopper to create a list of items in which they are interested. However, shoppers have to establish the shopping cart or list for each website. This typically includes logging in to each website and entering personal information. This process is inconvenient and time-consuming for the shopper and becomes yet another source of frustration. Additionally, such shopping carts are static, and provide no further guidance to shoppers.

A system for accessing large amounts of shopping data across multiple websites and providing dynamically portions of data to shoppers in a user selective format is greatly needed.

SUMMARY

A system for coordinating information from a plurality of websites and using this information to create a dynamic watchlist is provided. The system selectively provides this information to a user. In one embodiment, the system permits a user to access a plurality of websites and identify particular items of those websites that are of interest. The system stores the identified items on a watchlist for later retrieval, review, transmission or action by the user. The system may periodically inform the user of any changes to the items of interest.

BRIEF DESCRIPTION OF THE DRAWINGS

A more detailed understanding may be had from the following description, given by way of example in conjunction with the accompanying drawings wherein:

FIG. 5 shows a plurality of items added to the watchlist of FIG. 4;

FIG. 7 shows an updated watchlist of FIG. 4 as transmitted to a user showing any updates that were made since the last transmission of the watchlist;

FIG. 10 shows a third embodiment for adding items to a watchlist via widget on a website (WOW) functionality implemented on at least one website;

DETAILED DESCRIPTION

Figure 1:
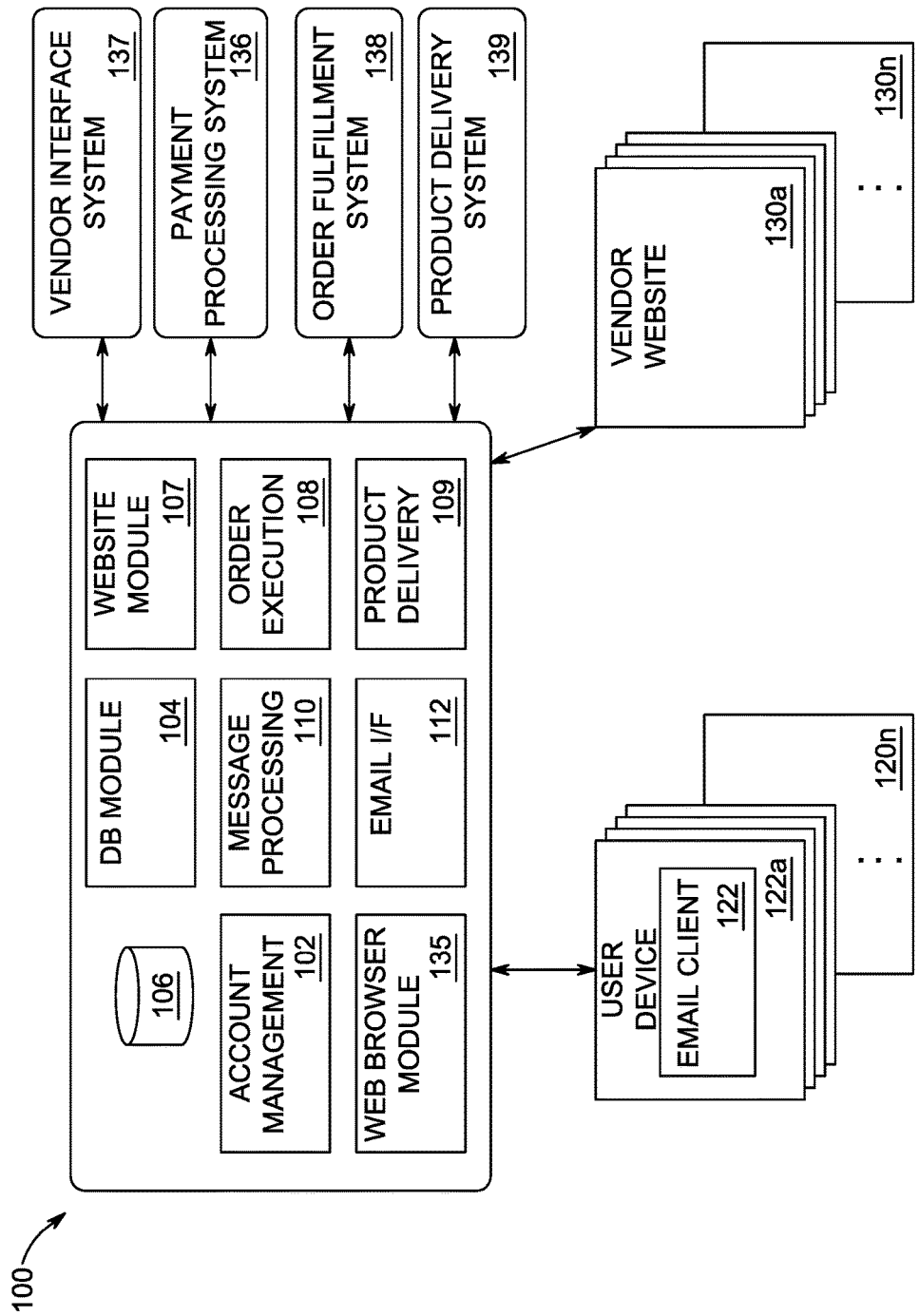
FIG. 1 shows a block diagram of a system architecture for creating a watchlist in accordance with the present invention.

FIG. 1 shows an example logical architecture 114 for email-based e-commerce and e-donation solicitations and collection. The example architecture 114 an e-commerce system 100, a payment processing system 136, a vendor interface system 137, a vendor order fulfillment system 138, and a product delivery system 139, and may interface with a plurality of user devices 120a-120n and a plurality of vendor websites 130a-130n.

The e-commerce system 100 may include an account management module 102, a database module 104, an e-commerce database 106, a website module 107, an order execution module 108, a product delivery module 109, a message processing module 110, a web browser module 135 and an email interface module 112.

Although not explicitly shown in FIG. 1A for simplicity, one or more of these modules may be functionally linked together as appropriate. As those of skill in the art would appreciate, the modules may be embodied as physical units that are physically linked together via one or more electronic bus structures, may be functional units that are functionally linked together via one or more communication protocols, or there may be a combination of physical or functional units. They may be programmed via software or firmware in a plurality of physically separate units, or may be incorporated into a single programmable unit. Accordingly, although the e-commerce system 100 may be described herein after as distinct and specific units or modules, this is for convenience of explanation, and these modules, systems or units may be variously combined into one or a plurality of units without departing from the spirit and scope of the present invention. Likewise, although the systems that interface with the e-commerce system 100 (for example the vend or interface system 137, the payment processing system 136, the order fulfillment system 138 and the product delivery system 139), are described as being separate and distained from each other and the e-commerce system 100, they may, in whole or in part, be incorporated into the e-commerce system 100 or part of one or more third-party systems.

As will be described in further detail hereinafter, the e-commerce system 100 and user devices 120a-120n may communicate to initiate and manage transactions such the searching, processing, tracking and purchase of goods and or/donations. As will also be described in further detail hereinafter, the e-commerce system 100 may communicate with the payment processing system 136, the vendor interface system 137, the vendor order fulfillment system 138 and the product delivery system 139 to execute the transactions. Additionally, one or more of such modules may be optional, for example, in an e-commerce configuration utilized for certain donations, the order execution module 108 and the product delivery module 109, and the order fulfillment system 138 and the product delivery system 139 may not be necessary.

The account management module 102 may manage data related to accounts for users and vendors that participate in commerce via the e-commerce system 100. The account management module 102 may be or include, for example, a web application.

Vendors may interact with the account management module 102 via the vendor interface system 137, which may comprise a web browser or a proprietary closed system. As one example, a vendor may provide information via the vendor interface system 137 to the account management module 102 such as: product, pricing or donation information to be used for email advertisements to be sent to users in email campaigns; periodic and/or aperiodic updates regarding product, pricing and donation information to be sent to users as selected by the users; email formatting information for email advertisements to be sent to users; financial information related to bank accounts and/or other types of financial accounts, (such as e-payment accounts such as PayPal accounts), for receiving payments from users of the e-commerce system 100, such as account numbers and/or other identifying information; and/or other information.

Users may interact with the account management module 102 via the web browser module 135. The web browser module 135 provides functionality for user access to the e-commerce system 100. Users may register with the e-commerce system 100 by interacting with the web browser module 135 via their web browser. The web browser module 135, in turn, interfaces with the account management module 102. This permits the account management module 102 and the web browser module 135 to support individualized functionality for each user. It should be noted that the web browser module 135 and the vendor interface system 137 may comprise a single module.

As will be described in detail hereinafter, the account management module 102 may track the shopping trends or statistics of the user including items browsed, items put on a watch list, items that were eventually purchased either for the user, (or as gifts for other people), or, if the user inputs such information, a history gifts browsed or purchased for specific individuals. The trends or statistics may include the length of time that a user spends on in item or certain category of items, the number of "clicks" on an item or certain category of items, (such as reviewing other user reviews, comparing several items or the like), the amount of time spent on viewing the item or type of item, or the number of times a user "returns" to an item or type of item during one or more shopping experiences. This allows the tracking and statistical determination of the likes and dislikes of each user. The account management module 102 may retain certain information regarding each user that the user directly inputs; for example, in response to one, or a series of website product questionnaires or surveys. All of this user-specific information is collected and stored.

A user of the user client device 120 may provide information to the account management module 102 via the web browser module 135 such as: an email address associated with the user; financial information associated with the user, for example a credit card information (such as a credit card number and expiration date), and/or other information related to bank accounts and/or other types of financial accounts (such as e-payment accounts) that may be used to make payments to vendors via the e-commerce system 100; shipping address information; billing address information; preferences regarding which vendors or non-profit organizations the user would like to receive email advertisements or e-donation solicitations from; and/or other information.

In a separate embodiment, the financial information of a user, such as bank account asset or credit card information, may be supplied to the account management module 102 for analysis of user preferences. This permits the account management module 102 to analyze all of the information for user preferences and to suggest items, services or non-profit organizations, in which the user may be interested. These suggestions may be emailed to the user for adding to a watchlist as will be described in detail hereinafter.

The account management module 102 may, either alone or via the database module 104, store information received from the user device 120 and/or the vendor website 130a-130n in the e-commerce database 106. The account management module 102 may also add information to the e-commerce database 106 when users and vendors register with the e-commerce system 100. This information may include one or more user identifiers, vendor identifiers and other identifying information.

The message processing module 110, (in conjunction with the email interface module 112), may generate advertisement or product update email messages, or e-donation solicitations for users that are registered with the e-commerce system 100, such as the users of the user devices 120a-120n. The advertisement, product update or e-donation email messages may be HyperText Markup Language (HTML) email messages, Rich Text Format (RTF) email messages, and/or may be defined according to any other current or future appropriate format. The advertisement, product update or e-donation email messages may include Uniform Resource Identifiers (URIs) or hyperlinks that are defined according to the mailto URI scheme. Each mailto URI or hyperlink may describe an email message that may be generated by an email client module (such as the email client module 122) when that URI or hyperlink is selected.

The generated email message may include a number of parameters that indicate, for example, a product or fundraising campaign that is described in the email message that the user wishes to purchase (or donate to). The generated message may alternatively include a number of parameters that indicate, for example, updated information regarding a product or fundraising campaign that a user has been tracking for possible future purchase or donation. The generated message may then be sent from the e-commerce system 100 to users from the email interface module 112.

The email interface module 112 may be configured to use one or more email accounts that are associated with the e-commerce system 100, and to send and receive messages associated with the one or more email accounts. The email interface module 112 and/or the email client module 122 in the user client device 120 may communicate email messages using technologies such as Simple Mail Transfer Protocol (SMTP), Post Office Protocol (POP) technology, Internet Message Access Protocol (IMAP), Remote Procedure Call (RPC) technology, HyperText Transfer Protocol (HTTP), and/or other current or future appropriate technologies. The interface module 112 and/or the email client module 122 may use these technologies to transmit and/or receive email messages via one or more email servers (not depicted), which may be directly interface with the e-commerce system 100, or may be a third party service such as constant contact or mail chimp.

The email client module 122 may be, or include, an email client such as Microsoft Outlook, Thunderbird, a web browser application, or any other current or future client application for the communication of email messages. In an instance where the email client module 122, is or includes, a web browser application, the email client module 122 may be the same web browser described hereinbefore that may be used to communicate with the account management module 102. Alternatively, the email client module 122 and the web browser described above that may be used to communicate with the account management module 102 may be different. As will be described in detail hereinafter, through the email client 122 on the user device 120a, the user may take one or more actions, such as replying to the email message, selecting one or more reply-to links in the email message, adding one or more items from the email message to a watchlist or the like.

The payment processing system 136 handles financial transactions associated with the purchase of an item or service, or a donation. The payment processing system 136 may be, as one example, a payment gateway operated by a financial institution. In an instance where the payment processing system 136 is a payment gateway, the payment processing system 136 may have a connection to one or more banking networks (not depicted) that it may use to process payments. The order execution module 108 may communicate with the payment processing system 136 using technology such as Transport Layer Security (TLS) or Secure Sockets Layer (SSL) technology. The vendor order fulfillment system 138 may be an order management system (OMS), Enterprise Resource Planning (ERP), supply chain management, electronic purchasing system, inventory control system, or any other appropriate system for fulfilling orders.

The e-commerce database 106 may store information such as information that describes and/or comprises email campaigns, email advertisements or fundraising campaigns that may be sent to users, user information, vendor information, product information, product information updates and history, donation-related information, order status information, and/or other information. Further, the e-commerce database 106 may store information that indicates correspondences between different email campaigns, advertisements, fundraising campaigns, users, vendors, products, donations, information related to order statuses, and/or other information. For each transmitted email, the e-commerce database 106 may store information that includes an identifier of the vendor associated with the particular email campaign, identifiers of the products or fundraising campaign associated with the email campaign, and/or other information. For each order that is placed with the e-commerce system 100, the e-commerce database 106 may store information such as an identifier of the user that placed the order or e-donation, when the order or e-donation was placed, an identifier of the vendor or non-profit organization associated with the order or the e-donation, and/or other information.

For each product described or type of e-donation in the e-commerce database 106, the e-commerce database 106 may store information that includes an identifier of the product or e-donation, a description of the product or e-donation, a title, an identifier of the vendor or non-profit organization associated with the product or e-donation, a cost of the product or amount of the e-donation, and/or other information. According to one approach, data that describes donations may be handled within the e-commerce database 106 in a similar matter to the data that describes products.

As one example for a product, the e-commerce database 106 may store information that indicates that a type of wine (e.g., "Wine One," with a product identifier of "0005") is sold by a vendor (e.g., "The Wine Shop," with a vendor identifier of "0163") for $15.00. In an e-donation example, the e-commerce database 106 may store information that indicates a non-profit organization (e.g., "Charitable Organization," with a vendor identifier of "1043") may receive donations for $5.00, $10.00, $25.00, $50.00, and $100.00. Each of the different donation amounts may be stored in the e-commerce database 106, (similar to different "products"). For example, the $100.00 donation may have a product identifier (or "donation identifier") of "0099." Further according to this example, the e-commerce database 106 may store information that indicates that the product with identifier "0099" indicates a donation of $100.00 to a vendor with the identifier of "1043." Alternatively or additionally, the e-commerce database 106 may store information (e.g., one or more flags or other fields) that indicates, for each product/donation, whether the product/donation relates to a donation or to a purchase of goods. It should be noted that the identifiers shown above are set forth by way of example only. Preferably, these identifiers randomized and/or encrypted for heighted security when sent in on email message.

The e-commerce database 106 may be spread across one or any number of computer-readable storage media (not depicted). For example, a portion of the e-commerce database 106 (i.e. sensitive data related to members) may reside on a vendor's or non-profit organization's website and may be accessed through the vendor interface system 137. The e-commerce database 106 may be or include, for example, a relational database, a hierarchical database, an object-oriented database, a flat file, a spreadsheet, or a structured file. The database module 104 may interface with a database management system (not depicted) in order to add data to, modify data in, or obtain data from the e-commerce database 106. Alternatively or additionally, the database module 104 may perform database driver and/or database client functionality to interact with the database management system. The database management system may be based on a technology such as Microsoft SQL Server, Microsoft Access, MySQL, PostgreSQL, Oracle Relational Database Management System (RDBMS), Not Only SQL (NoSQL), or any other appropriate technology.

The website module 107 provides all of the functionality to support a working website. These functions include displaying a plurality of web pages to a user and providing the standard functionality of a webpage such as graphics and video, links to different parts of the website, user login and authentication, support for purchases, security features and an interface to user support. The website module 107 provides the graphical interface and user experience to the web user, and supports the functionality as will be described in detail hereinafter. It should be noted that the web-site module 107 may be provided by a third party which hosts websites.

Figure 2:
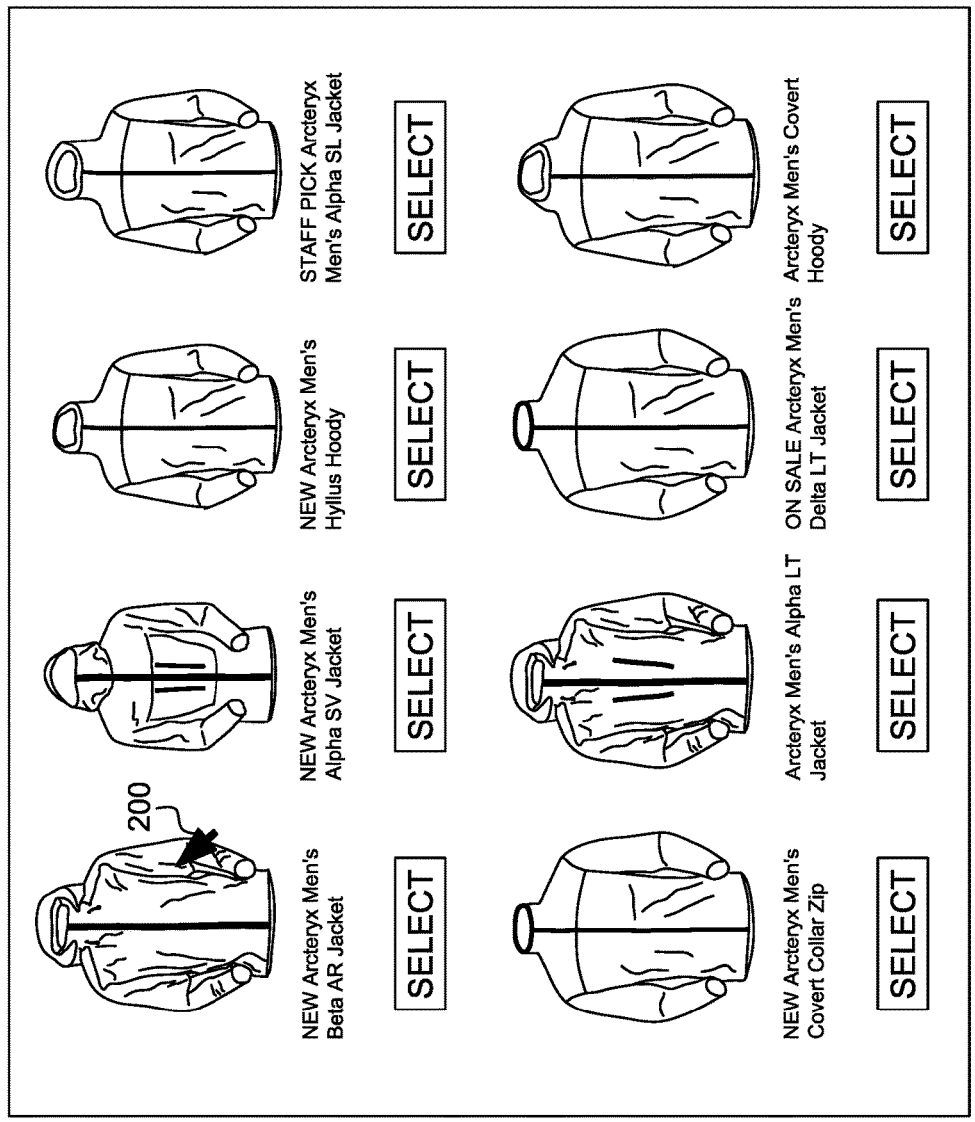
FIG. 2 shows a plurality of items for sale on a retail website.

FIG. 2 shows a website displaying a plurality of consumer items for sale. Although in this example, the consumer items are men's winter coats, they may be any type of item, service or gift (including a donation) available for selection and purchase. Each item is associated with a plurality of attributes, (which are not shown in FIG. 2). The attributes may be one or more words, numbers or other identifiers that may be used to describe, or may be associated with, the item. In one example, this may include brand, size, price, type (for example winter, men's, coat, hoodie, waterproof), color, model, etc.

As those of skill in the art would understand, there may also be many attributes associated with each consumer item that are not intended for the users to utilize, but rather they are for the website proprietor or vendors to utilize. Any, or all, of these attributes may be used for tracking and evaluation by the e-commerce system 100. For example, a "program" attribute may be used by a vendor to track the success of a vendor's current promotional effort to sell a certain line of clothing, or grouping of clothing lines and accessories. In one example, the "program" attribute may identify certain coats as from the Arcteryx company.

By further example, a "linking" attribute may be used by the website proprietor to track the success of their effort to "upsell" to the user, for example from a less expensive to a more expensive item, or to have the user buy accessories to the item that the user has selected. The linking attribute will associate two or more products together; most likely similar products that increase in price. These attributes will be described in greater detail hereinafter.

Referring back to FIG. 2, the user may browse through the items, comparing features among different items. Having looked at all of the attributes, the user may view a particular item and, concluding that this item is the item they were looking for, select the item, (such as a specific coat). They may select the item as indicated by placing the cursor over the picture of the item or the select button and clicking on it. The selection in this example is a men's yellow hoodie pullover coat as indicated by the cursor 200.

Figure 3:
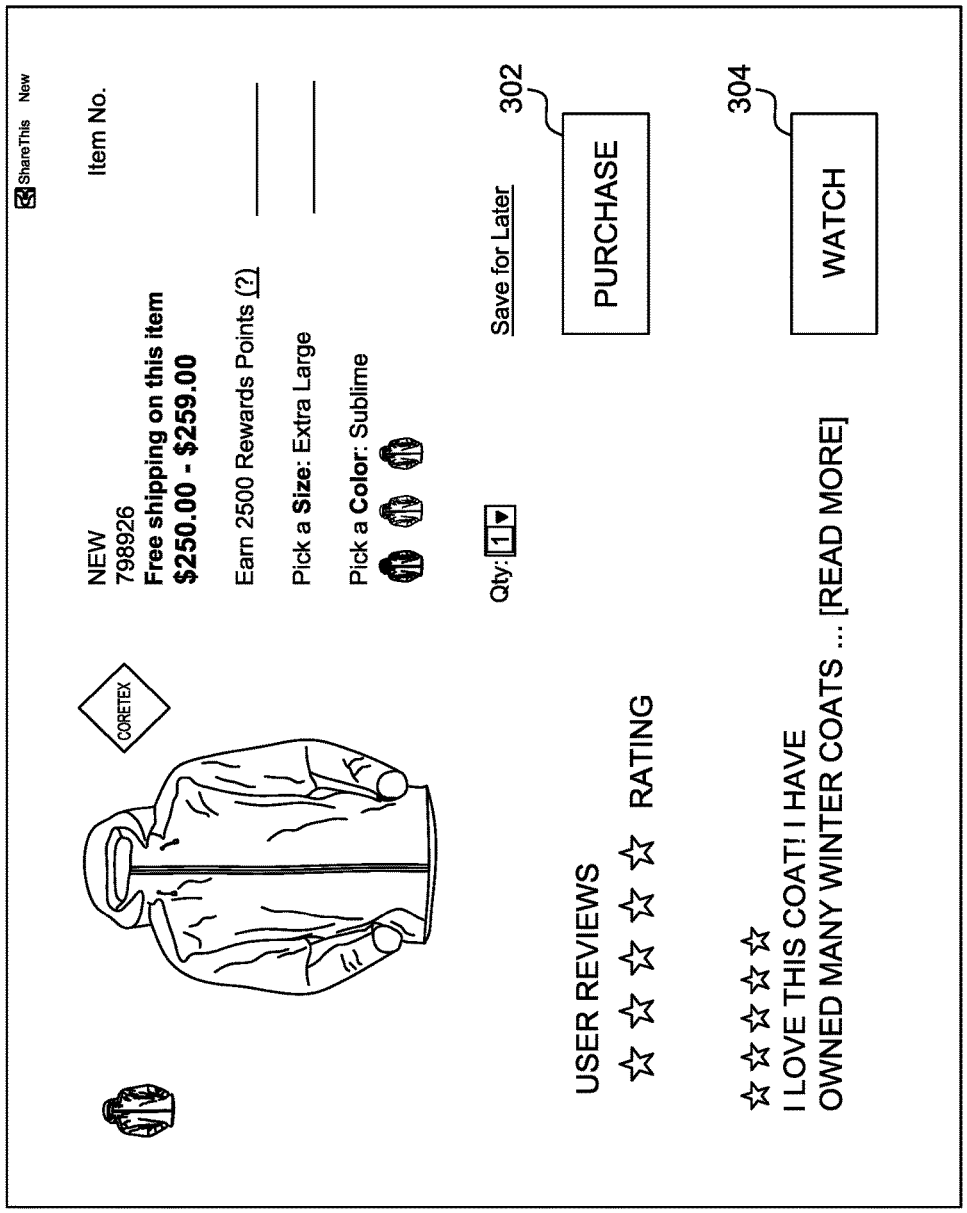
FIG. 3 shows one of the plurality of items for sale on the retail website with a button permitting the user to add the item to a watchlist.

This selection brings the user to another web page with more detailed information regarding the item as shown in FIG. 3. For example, the user may read other user reviews, manufacturer information and warranty information. However, the price of $259 may be greater than what the user is willing to pay at this time. Accordingly, instead of putting the item into their shopping basket and proceeding to purchase using the "Purchase" button 302, the user may select the watch list button 304, indicated in FIG. 3 as "Watch".

Figure 4:
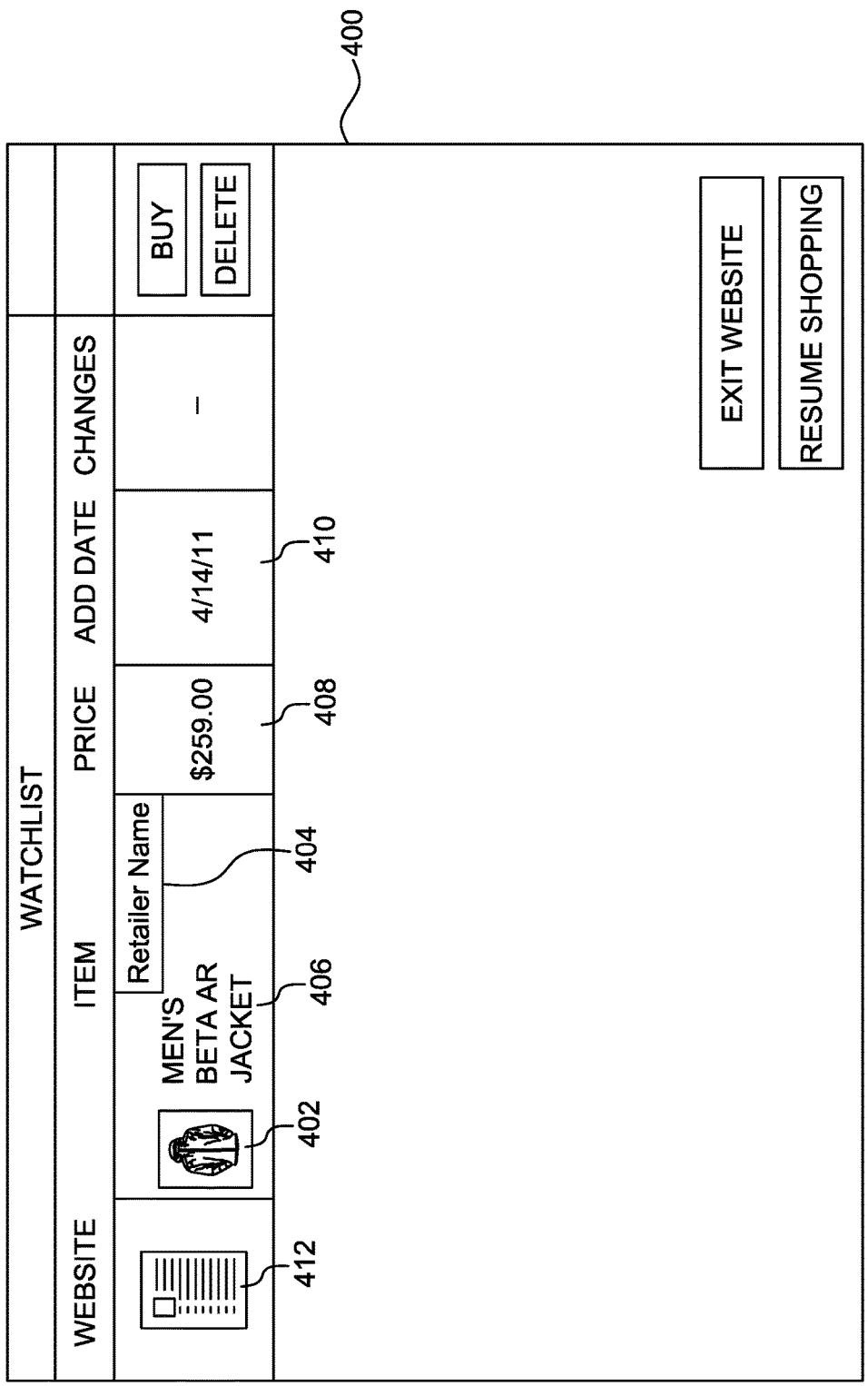
FIG. 4 shows an item as added to a watchlist.

Selection to put the item on the watch list opens up a user's watch list 400, which is shown in FIG. 4. The watchlist 400 keeps track of the selected item and all of the relevant associated information at the time of selection by the user. It should be noted that the amount and type of information that is displayed on the watchlist 400 is configurable by the user. Therefore, more or less information, than shown in FIG. 4 as desired by the user may be displayed or stored. In the example shown in FIG. 4, the picture 402, the manufacturer 404, the type 406, the price 408, the website 412 from which the item was added and the watchlist "add" date are all stored. The user may create a more extensive watchlist 400 by repeating the method described with reference to FIGS. 2-4 and adding more items. This more extensive watchlist 500 is shown in FIG. 5, by way of example.

Referring to FIG. 5 additional items are shown that the user has put on the watchlist 500, including performance socks and an extreme weather backpack. All of these items and their associated information are stored for later use by the user or the vendor (or the non-profit organization as appropriate) as will be described in detail hereinafter. The user may exit the website by selecting the "Exit Website" button 502, or my resume shopping by selecting the "Resume Shopping" button 504.

Figure 6:
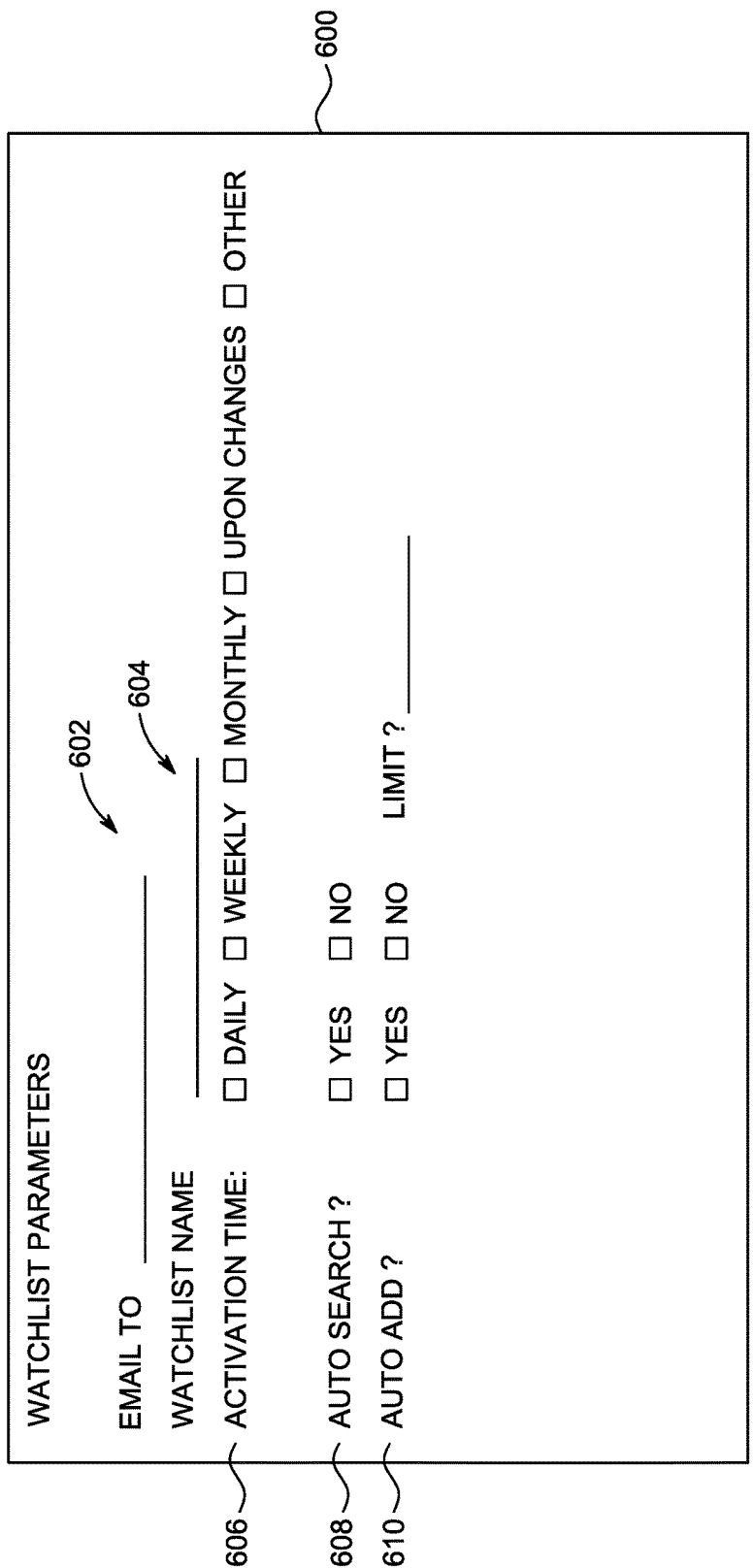
FIG. 6 shows a watchlist parameter configuration screen.

In an optional embodiment, the first time that a user creates (or the e-commerce system 100 automatically creates) a watchlist, they may be taken to a "watchlist parameter" screen 600 as shown in FIG. 6. This watchlist parameter screen 600 permits the user to configure the features of the watchlist to suit their needs. The user must first enter the email address 602 to which they want the watchlist to be sent. Alternatively, the system 100 may "remember" the users website, and autofill that particular email address (and the remainder of this information to be described herein with reference to FIG. 6). Next, the user selects a name 604 for the watchlist (for example "Christmas", or "grandmom's birthday"). The user then selects an activation time 606 specifying when they want to watchlist to be emailed. This activation time 606 may be a specific date and/or time, or may be periodic for example hourly, daily, weekly monthly or upon changes. Once a watch list is generated, for example the one shown is FIG. 5, it may be stored in stored in the e-commerce database 106. As will be discussed in greater detail hereinafter, the system 100 uses the watch list, and optionally the user's preferences, to generate an active watch list.

If the user selects an activation time 606 of hourly, (for example, in the case of an auction), daily, weekly, or monthly, the watchlist is emailed to them on the selected periodic basis. In contrast, the "upon changes" selection permits the user to receive an emailed watchlist when some aspect of the watchlist has changed. This is shown in FIG. 7. The "other" option permits the user to select when the want to be notified, including a specific periodicity, selected dates, or specific times or occasions.

Referring to FIG. 7, the watchlist 700 as shown is emailed in response to the "upon changes" selection, and the watchlist indicates two changes: a change to the price of the first item (the Beta AR Jacket) 702, and an additional available color of the second item (the performance socks) 704. The new price may also be shown 706. The user may take action by buying one of the items on the watchlist or deleting one of the items, or may take no action.

It should be noted that the user may create a plurality of different watchlists. For example, the user may create a Christmas watchlist for dad, a Hanukkah watchlist for mom, and/or a birthday watchlist for grandmom. All of these watchlists may be independently created, configured and emailed to the user. For ease of use, the watchlists may be combined into create a single watchlist.

The "auto search" 608 feature shown in FIG. 6 permits the system 100 to automatically search website (or optionally, multiple websites) for items that are similar to the items that the user selects for placing on their watchlist. The user may be notified separately of these additional items via email or via a separate section of the watchlist. The system 100 suggests other similar alternatives to the user and asks the user for permission to add these items on their watchlist.

The "auto add" 610 feature shown in FIG. 6 goes one step further than the auto search 608 feature, in that it automatically adds the similar items to the website without prior authorization from the user. As would be understood by those of skill in the art, additional limitations may be set in place as shown in FIG. 6 to ensure that too many additional items may not be added. By way of illustration, a limitation of 2 additional similar "auto-added" items per selected item, or 5 additional auto-added items overall may be set by the user.

Figure 8:
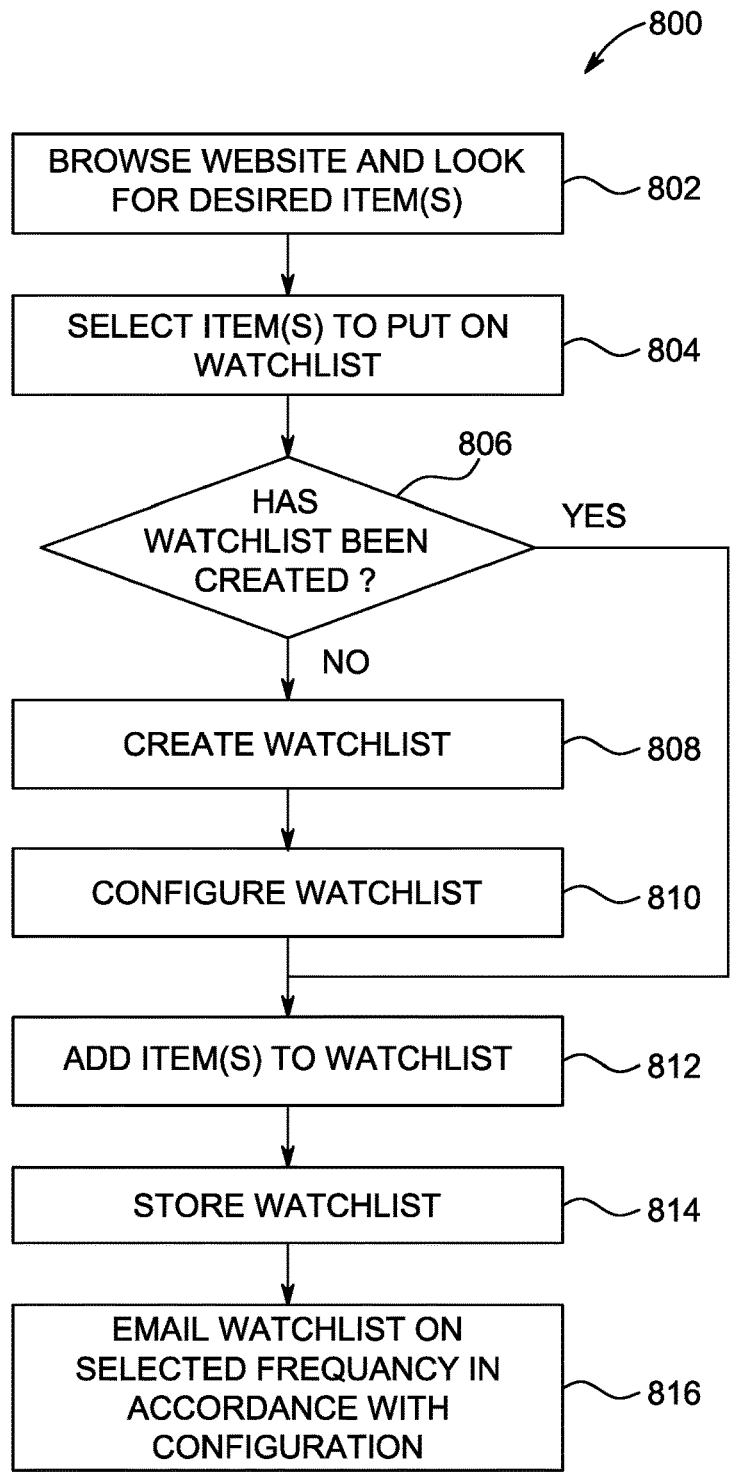
FIG. 8 is a flow diagram of a method in accordance with the present invention.

The method 800 of this embodiment is shown with reference to FIG. 8. The user browses the selected website and searches for desired items 802. The user selects the desired item(s) to put on their watchlist 804. A determination 806 is made to see if a watchlist was already previously created. If a watchlist has not been created, a watchlist is created 808. The user configures the watchlist in accordance with their preferences 810, and the item(s) are put on the watchlist. It should be noted that steps 806-810 may be optional in that a default setting may be used to automatically create a "standard" or "base" watchlist as shown in FIGS. 4, 5 and 7. Therefore, in this alternative embodiment, the watchlist is automatically created by the e-commerce system 100 when a first watchlist item is added.

If the watchlist was already created, the method 800 skips to the step of putting items on the watchlist 812. The watchlist is then stored 814. The watchlist is then emailed 816 to the user on the frequency selected during the user's configuration of their watchlist, or on a default frequency or setting.

It should be understood by those of skill in the art that the presently inventive e-commerce system 100 is flexible to utilize in a variety of different manners.

In one example, a user may put one or more items that have a limited quantity or limited availability duration. If a website provides quantity or availability duration information along with the other information provided about an item, the user may also put such an item on their watchlist for tracking. One such example may be movie tickets, (or likewise concert or event tickets) for a particular event at a particular time. The user may put such an item on their watchlist, and as either the event time approaches or the tickets are within a predetermined number of tickets from becoming sold out, the user may be notified by receiving the transmitted watchlist with the updated information. This same notification may work for items for which the stock is running out.

Likewise, a user may put items on their watchlist that are not yet available, such as show, concert or sporting event tickets. Once these tickets become available the user may be notified via the parameters set forth on their watchlist.

Figure 9:
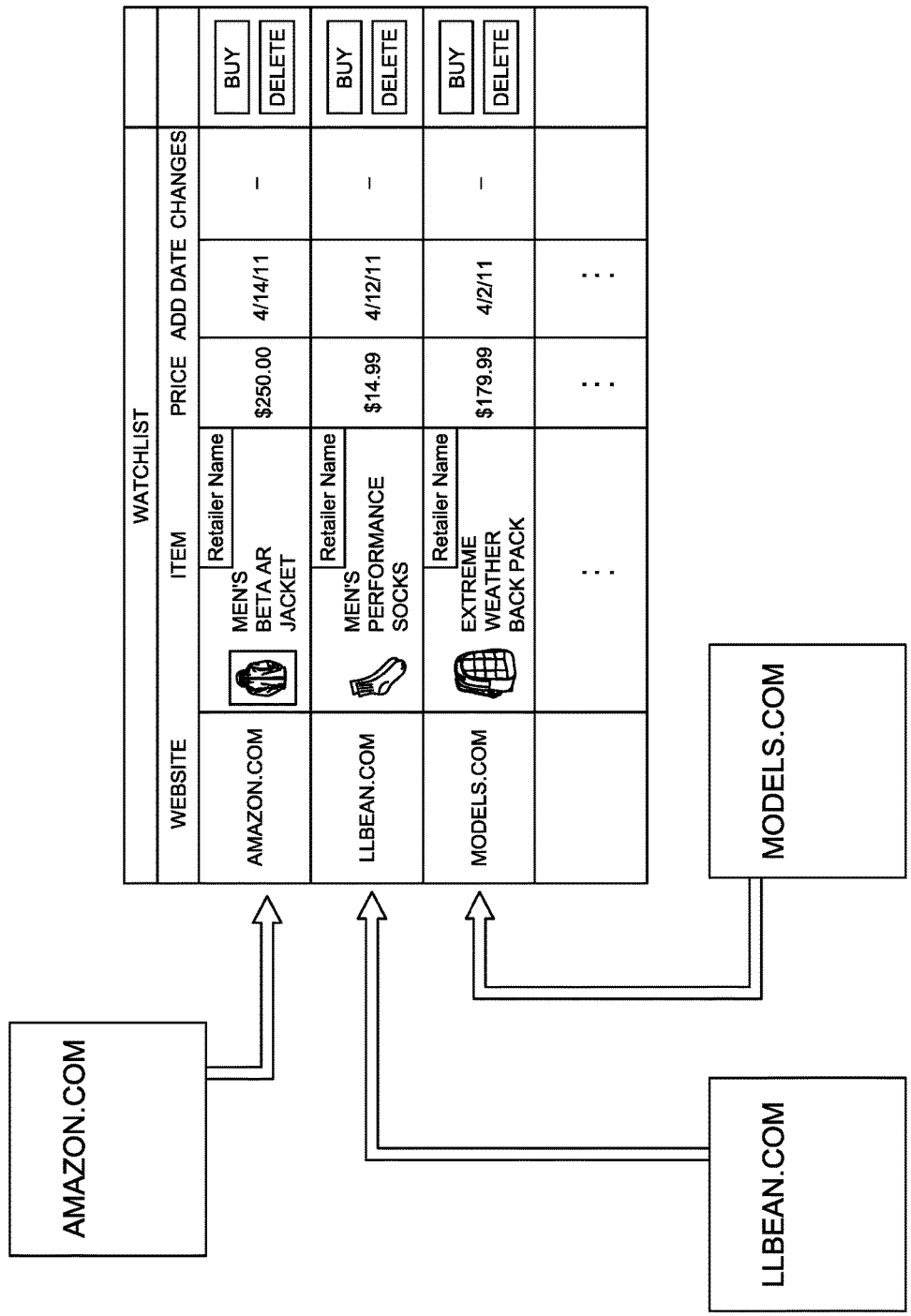
FIG. 9 shows a second embodiment for adding items to a watchlist from a plurality of websites.

Referring to FIG. 9, a second embodiment is shown. This embodiment is similar to the aforedescribed embodiment of FIGS. 1-7, except that the watchlist of this embodiment may be generated from items on a plurality of websites. Each of the watchlist items may be from different websites as is graphically illustrated in FIG. 9. The user may browse a plurality of websites, which are illustrated by example as Amazon.com, LLBean.com and Models.com. As the user browses the websites, and selects one or more items, these items are placed in their one or more watchlists.

This functionality provides the user with exceptional convenience in tracking a plurality of items over a plurality of websites in a single, central location, while receiving updates regarding those items in a manner in which the user has selected.

There are at least two alternatives for permitting items from multiple websites to be added to a watchlist; a first alternative captures the information of an item that the user wants to place on their watchlist from the particular website, and stores this information in the e-commerce system 100; and the second alternative utilizes functionality (called WOW, for "widget on a website") at each website to communicate with the e-commerce system 100 and transmit this information and any updated information to the e-commerce system 100. These two alternatives will be explained in detail hereinafter.

In the first alternative, the user browses one or more websites, and when they have identified an item that they want to add to their watchlist, they perform a "screen capture", on the particular item. This information must be saved, and then later pasted into an email or a screen of the e-commerce system 100. The screen is scrubbed for all relevant information and added to the watchlist. The e-commerce system 100 may then periodically send out one or more web crawlers to update this information on a basis as set forth by the user. One of skill in the art would appreciate that this alternative may meet with mixed results depending upon the information that is available on each website.

Figure 10:
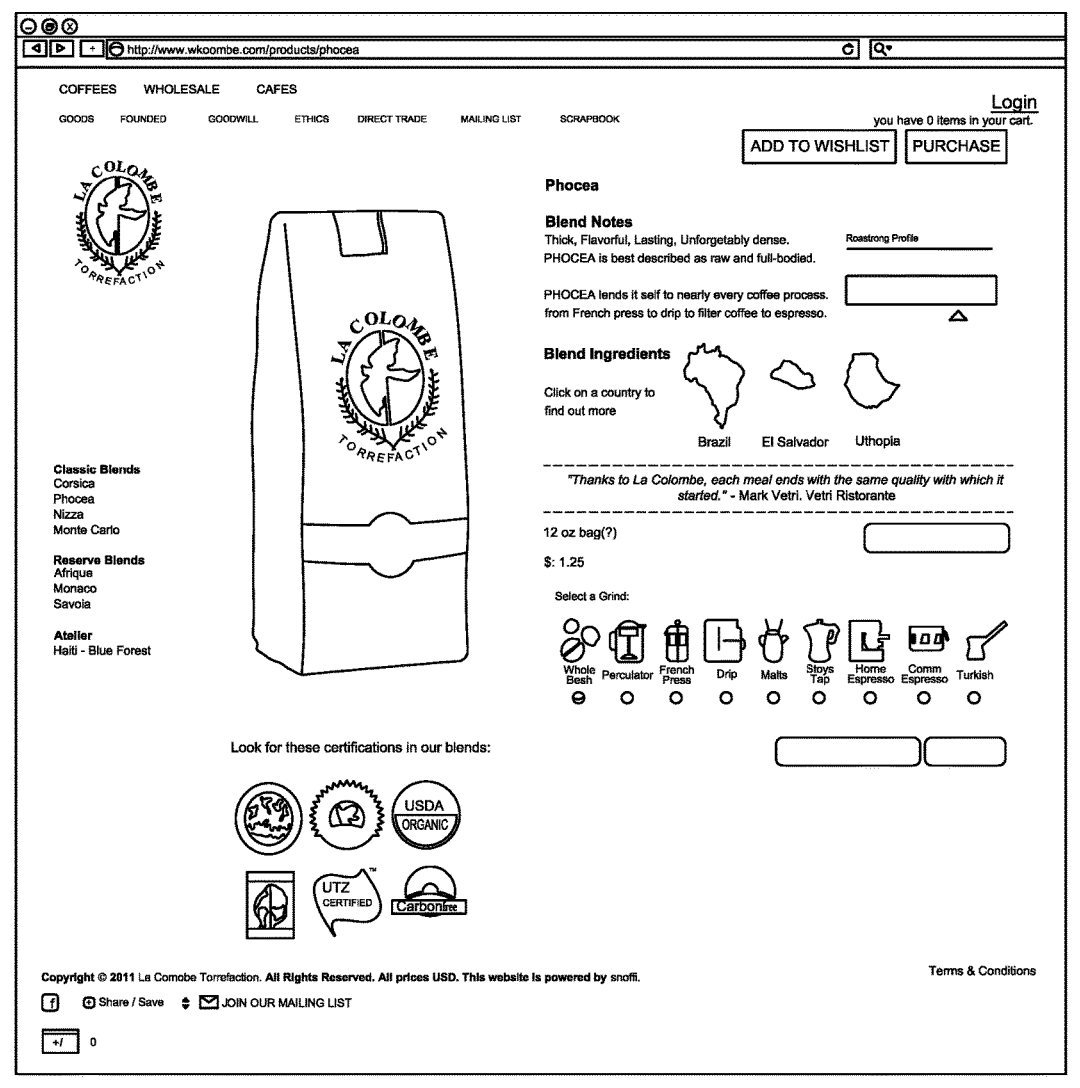

In the second alternative, shown in FIG. 10, the WOW functionality is included on each "participating" website. A participating website is a website that has incorporated WOW functionality, that will automatically transmit the desired information directly to the e-commerce system 100. This permits the information for adding to the watchlist to be seamlessly added and also seamlessly updated as selected by the user.

Referring to FIG. 10, a typical retail web page is shown. The WOW functionality can be seen in the "Add To Watchlist" button at the upper right-hand corner of the web page. The user may purchase an item as on any typical website by selecting the "Purchase" button. However, if the user alternatively selects the "Add To Watchlist" button, all relevant information associated with that item is automatically added to the user's watchlist. If the user has a plurality of watchlists, a menu of the user's watchlists will be displayed in response to selecting the Add To Watchlist button. The user then selects the appropriate watchlist and the item is thereby added. As will be understood by those of skill in the art, this scheme has tremendous advantages over current systems.

Figure 11:
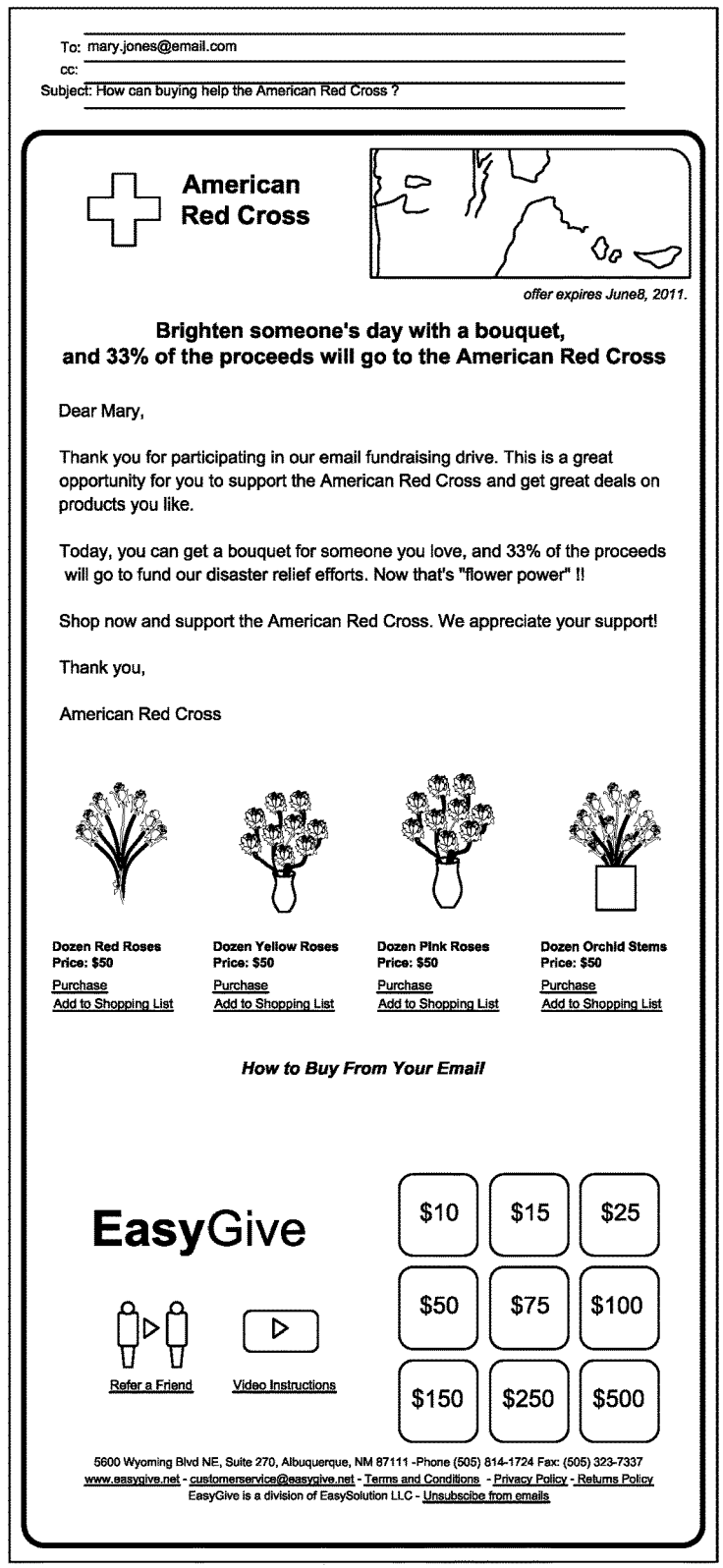
FIG. 11 shows a fourth embodiment for adding items to a watchlist in response to an email.

In a third embodiment, items may be added to a user's watchlist in response to an email sent from the e-commerce system 100. Such an embodiment is illustrated in FIG. 11. Referring to the example set forth in FIG. 11, an email sent from the e-commerce system 100 is shown. The email is branded as part of a fundraiser campaign from the American Red Cross. This email solicits the user to buy flowers, whereupon the American Red Cross receives 33% of the proceeds. As shown below each item, (shown as a flower arrangement), the user has the option of purchasing the item or adding the item to their watchlist, by selecting the appropriate button.

In a fourth embodiment, using the WOW functionality, if the user selects the "Auto Add" feature (as shown in FIG. 6), the e-commerce system 100 searches other WOW-affiliated websites and adds similar items (the ones selected for placing on the watchlist by the user), automatically to the watchlist. Since the WOW functionality permits all of the websites to communicate directly with the e-commerce system 100, the e-commerce system 100 is able to provide other relevant selections. It should be noted that this also provides the WOW-affiliated websites an tremendous opportunity to cross-sell to users that are actively searching for a particular product.

In another embodiment, the e-commerce system 100 may conduct a reverse auction among the one or more WOW-affiliated websites for the item(s) on the watchlist. This permits the user to receive the best possible price on the watchlist item(s).

Figure 12:
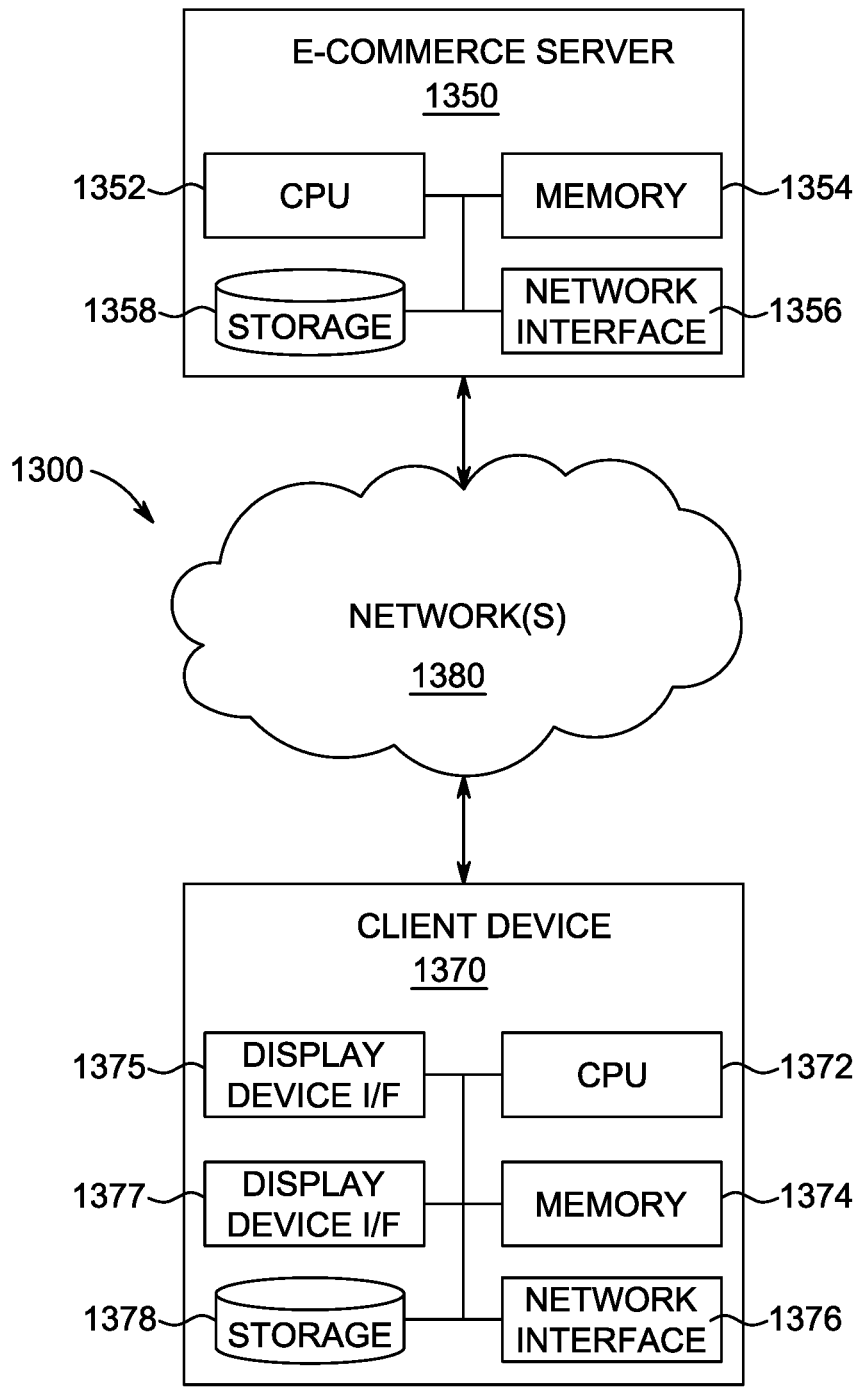
FIG. 12 shows an example system that may be used to implement features described herein with reference to FIGS. 1-11.

FIG. 12 shows an example system 1300 that may be used to implement features described above with respect to FIGS. 1-11. The example system 1300 includes an e-commerce server 1350, a client device 1370, and one or more networks 1380.

The e-commerce server 1350 may include at least one processor 1352, memory device 1354, network interface 1356, and storage device 1358. The client device 1370 may include at least one processor 1372, memory device 1374, network interface 1376, input device interface 1375, display device interface 1377, and storage device 1378.

The e-commerce server 1350 may be configured to perform any feature or combination of features described above with reference to FIGS. 1-11 as performed by the account management module 102, database module 104, order execution module 108, message processing module 110, and/or email interface module 112. The client device 1370 may be configured to perform any feature or combination of features described above with reference to FIGS. 1-11 as performed by the email client module 122 and/or the web browser module in the customer client device 120. The client device 1370 may be, for example, a desktop computer, a laptop computer, a netbook, a tablet computer, a personal digital assistant (PDA), a cellular phone, or any other appropriate device.

Each or any of the memory devices 1354, 1374 may be or include a device such as a Dynamic Random Access Memory (D-RAM), Static RAM (S-RAM), or other RAM or a flash memory. Each or any of the storage devices 1358, 1378 may be or include a hard disk, a magneto-optical medium, an optical medium such as a CD-ROM, a digital versatile disk (DVDs), or Blu-Ray disc (BD), or other type of device for electronic data storage. The storage device 1358 in the e-commerce server 1350 may store the information or any subset of the information described above with reference to FIGS. 1-11 as stored in the e-commerce database 106.

Each or any of the network interfaces 1356, 1376 may be, for example, a communications port, a wired transceiver, or a wireless transceiver. Each or any of the network interfaces 1356, 1376 may be capable of communicating using technologies such as Ethernet, fiber optics, microwave, xDSL (Digital Subscriber Line), Wireless Local Area Network (WLAN) technology, wireless cellular technology, and/or any other appropriate technology. The network interfaces 1356, 1376 may be used by the e-commerce server 1350 and/or the client device 1370 to communicate via the one or more networks 1380. The network interface in the e-commerce server 1350 may be configured to communicate any of the messages and/or other information described above with reference to FIGS. 1-11 as communicated by the account management module 102, database module 104, order execution module 108, message processing module 110, and/or email interface module 112. The network interface 1376 in the client device 1370 may be configured to communicate any of the messages and/or other information described above with reference to FIGS. 1-12 as communicated by the email client module 122 and/or by the web browser module in the customer client device 120 used for communicating with the account management module 102.

The one or more networks 1380 may include one or more private networks and/or one or more public networks such as the Internet. The one or more networks 1380 may be based on wired and/or wireless networking technologies.

The input device interface 1375 in the client device 1370 may be an interface configured to receive input from an input device such as a keyboard, a mouse, a trackball, a scanner, a touch screen, a touch pad, a stylus pad, and/or other device. The input device interface 1375 may operate using a technology such as Universal Serial Bus (USB), PS/2, Bluetooth, infrared, and/or other appropriate technology. The input device interface 1375 may be configured to receive any or any combination of the user input described above with reference to FIGS. 1-11 as received by the by the email client module 122 and/or by the web browser module in the customer client device 120 used for communicating with the account management module 102.

The display device interface 1377 may be an interface configured to communicate data to a display device (not depicted). The display device interface 1377 may operate using technology such as Video Graphics Array (VGA), Super VGA (S-VGA), Digital Visual Interface (DVI), High-Definition Multimedia Interface (HDMI), or other appropriate technology. The client device 1370 may include or be connected to a display device (not depicted) via the display device interface 1377. The display device may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device may be configured to display, based on data received via the display device interface 1377, any display elements described above with reference to FIGS. 1-11 as displayed by the email client module 122 and/or by the web browser module in the customer client device.

The memory device 1354 and/or the storage device 1358 of the e-commerce server 1350 may store instructions which, when executed by the at least one processor 1352, cause the at least one processor 1352 to perform any feature or combination of features described above with reference to FIGS. 1-11 as performed by the account management module 102, database module 104, order execution module 108, message processing module 110, and/or email interface module 112. The memory device 1374 and/or the storage device 1358 of the client device 1370 may store instructions which, when executed by the at least one processor 1372, cause the at least one processor 1372 to perform any feature or combination of features described above with reference to FIGS. 1-11 as performed by the email client module 122 and/or by the web browser module in the customer client device 120 used for communicating with the account management module 102.

Although FIG. 12 shows a single e-commerce server 1350 and a single client device 1370, the functionality described above with reference to FIG. 12 as performed by the e-commerce serve 1350 and/or the client device 1370 may be distributed across any number of devices that possesses similar characteristics and/or that include similar components 1352, 1354, 1356, 1358, 1372, 1374, 11375, 1376, 1377 as the e-commerce server 1350 and/or the client device 1370.

While examples are provided above with respect to the Figures which includes the use of email communications, the features described above with respect to the Figures may also be implemented using different types of communications technology. For example, the features described above with reference to the Figures may also be implemented, mutatis mutantis, using technologies that include any one or any combination of: email; instant messaging; enterprise messaging; Short Message Service (SMS); Multimedia Messaging Service (MMS); and/or any other appropriate technology for the electronic communication of data.

As use herein, the term "vendor" broadly refers to and is not limited to a business, a non-profit organization, any other type of organization, and/or an individual person. One example of a business is an online retailer. Examples of non-profit organizations include charitable organizations, educational institutions such as schools and universities, arts organizations, and recreational organizations. Examples of recreational organizations include historical or preservation societies, local recreational sports leagues.

As used herein, the term "processor" broadly refers to and is not limited to a single- or multi-core general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable storage medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although features and elements are described above in particular combinations, each feature or element can be used alone or in any combination with or without the other features and elements. For example, each feature or element as described above with reference to the Figures may be used alone without the other features and elements or in various combinations with or without other features and elements. Sub-elements of the methods and features described above with reference to the Figures may be performed in any arbitrary order (including concurrently), in any combination or sub-combination.

What is claimed is:

1. A system comprising:
a watchlist, stored by a non-vendor third party, that is associated with a particular user and includes product information from a plurality of vendor websites, wherein the plurality of vendor websites includes a first vendor website and a second vendor website;
at least one first processor, of the first vendor website, configured to:
produce a web page including vendor product information for a particular product, and
produce a widget on a web site, wherein the widget on the web site in response to a user input from the particular user, adds the particular product to the watchlist by transmitting the vendor product information for the particular product to the non-vendor third party; and
at least one second processor, of the non-vendor third party, configured to update the watchlist in response to receiving the vendor product information for the particular product from the widget on the first vendor website, wherein the watchlist is updated by the at least one second processor:
adding the vendor product information for the particular product to the watchlist,
identifying one or more related products that are related to the particular product on the second vendor website,
adding the one or more relate products to the watchlist, and
sending the watchlist to the particular user.

2. The system of claim 1 wherein, in response to the user input, the widget on the web site automatically adds vendor product information for similar products from the first vendor website to the watchlist.

3. The system of claim 1 wherein the widget on the web site provides direct communication between the widget on the web site and the at least one second processor.

4. The system of claim 1 wherein in response to the user input, a menu including a plurality of watchlists of the user is provided.

5. The system of claim 1 wherein the identifying the one or more related products is performed by the at least one second processor:
receiving a screen capture of a second web page from the second vendor website, and
scrubbing the screen capture for information of the one or more products related to the particular product.

6. The system of claim 1 wherein the at least one second processor is configured to send web crawlers to update information on the watchlist.

7. The system of claim 1, wherein the identifying the one or more related products is performed using a second widget on the web site that is generated on the vendor second website.

8. The system of claim 7, wherein the second widget on the web site adds a second particular product to the watchlist by transmitting second vendor product information for the second particular product to the non-vendor third party, in response to a second user input from the particular user on the second vendor website.

9. A method comprising:
storing, by a non-vendor third party, a watchlist that is associated with a particular user and includes product information from a plurality of vendor websites, wherein the plurality of vendor websites includes a first vendor website and a second vendor website;
producing, by at least one first processor of the first vendor website, a web page including vendor product information for a particular product;
producing, by the at least one first processor, a widget on a web site;
transmitting, by the widget on the web site, the vendor product information for the particular product to the non-vendor third party, in response to a user input from the particular user;
updating, by at least one second processor of the non-vendor third party, the watchlist in response to receiving the vendor product information for the particular product from the widget on the web site; and
sending, by the at least one second processor, the watchlist to the particular user,
wherein the updating includes:

adding the vendor product information for the particular product to the watchlist, identifying one or more related products that are related to the particular product on the second vendor website, adding the one or more relate products to the watchlist.

10. The method of claim 9 wherein, in response to the user input, the widget on the web site automatically adds vendor product for similar items from the first website to the watchlist.

11. The method of claim 9 wherein the widget on the web site provides direct communication between the first vendor website and the at least one second processor.

12. The method of claim 9 wherein in response to the user input, providing a menu including a plurality of watchlists of the user.

13. The method of claim 9, wherein identifying one or more related products includes: receiving, by the at least one second processor, a screen capture of a second web page from the second vendor website, and; and scrubbing, by the at least one second processor, the screen capture for information of the one or more products related to the particular product.

14. The method of claim 9 further comprising sending, by the at least one second processor, web crawlers to update information on the watchlist.

15. The method of claim 9, wherein the identifying the one or more related products is performed using a second widget on the web site that is generated on the vendor second website.

16. The method of claim 15, wherein the second widget on the web site adds a second particular product to the watchlist by transmitting second vendor product information for the second particular product to the non-vendor third party, in response to a second user input from the particular user on the second vendor website.

* * * * *